(12) United States Patent
Miller et al.

(10) Patent No.: US 12,104,827 B2
(45) Date of Patent: Oct. 1, 2024

(54) HYBRID SOLAR WINDOW AND IR ABSORBING ASSEMBLIES

(71) Applicant: 3M INNOVATIVE PROPERTIES COMPANY, St. Paul, MN (US)

(72) Inventors: Adam D. Miller, Vadnais Heights, MN (US); Timothy J. Hebrink, Scandia, MN (US); Neeraj Sharma, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 154 days.

(21) Appl. No.: 17/919,306

(22) PCT Filed: May 6, 2021

(86) PCT No.: PCT/IB2021/053841
§ 371 (c)(1),
(2) Date: Oct. 17, 2022

(87) PCT Pub. No.: WO2021/229378
PCT Pub. Date: Nov. 18, 2021

(65) Prior Publication Data
US 2023/0160607 A1    May 25, 2023

(51) Int. Cl.
*F24S 20/63*        (2018.01)
*F24S 10/70*        (2018.01)
(Continued)

(52) U.S. Cl.
CPC .............. *F24S 20/63* (2018.05); *F24S 10/70* (2018.05); *F24S 23/74* (2018.05); *F24S 70/225* (2018.05); *F24S 2023/84* (2018.05)

(58) Field of Classification Search
CPC . G02B 5/282; F24S 20/63; F24S 10/40; F24S 10/50; F24S 10/70; F24S 70/225;
(Continued)

(56) References Cited

U.S. PATENT DOCUMENTS 2,888,007 A  *  5/1959  Zvi Tabor .............. F24S 23/30
                                                    136/246
3,107,052 A     10/1963  Garrison et al.
(Continued)

FOREIGN PATENT DOCUMENTS

DE      2838422 A1    3/1980
EP      3644099 A1    4/2020
(Continued)

OTHER PUBLICATIONS

"DOWTHERM and SYLTHERM Heat Transfer Fluids in Sub-Zero Systems" Application Guide, Dow Corning Corporation, (publication date unknown but believed to be prior to the date of the filing of the present application), 8 pages.
(Continued)

*Primary Examiner* — Kyle J. Walraed-Sullivan
(74) *Attorney, Agent, or Firm* — Bradford B. Wright (57) ABSTRACT

A hybrid solar window comprises: at least one glazing; a wave-length-selective solar mirror positioned to reflect IR toward an IR absorbing element. The IR absorbing elements comprises a conduit having a respective fluid inlet and fluid outlet, and an IR absorbing compound, wherein the IR absorbing compound is in thermal communication with the conduit. The wavelength-selective solar mirror has an average visible light transmittance of at least 50 percent and an average IR reflectance of at least 50 percent over the wavelength range of 850 to 1150 nanometers, inclusive. The IR absorbing element is configured to transfer thermal energy to a heat transfer fluid circulating through the conduit, wherein the IR absorbing element has an average visible light transmittance of at least 30 percent, and wherein each IR absorbing element has an average IR absorptance of at least 50 percent over the wavelength range 850 to 1150
(Continued)

nanometers, inclusive. Certain IR absorbing elements are also disclosed.

11 Claims, 9 Drawing Sheets

(51) Int. Cl.
   *F24S 23/74* (2018.01)
   *F24S 70/225* (2018.01)
   *F24S 23/70* (2018.01)

(58) Field of Classification Search
   CPC ........ F24S 2023/84; F24S 23/70; F24S 23/77; F24S 70/12; E06B 3/6715; E06B 2009/2417; C03C 17/3663; G02F 1/133553
   See application file for complete search history.

(56) References Cited

U.S. PATENT DOCUMENTS

| | | | |
|---|---|---|---|
| 4,014,313 A * | 3/1977 | Pedersen | F24S 10/755 126/663 |
| 4,081,934 A * | 4/1978 | Franz | E06B 3/66366 52/786.13 |
| 4,159,707 A * | 7/1979 | Miquel | A01G 9/243 427/160 |
| 4,412,528 A * | 11/1983 | Elzinga, Jr. | F24S 60/00 126/633 |
| 4,453,535 A * | 6/1984 | Tolonen | F24S 10/20 126/710 |
| 4,520,611 A * | 6/1985 | Shingu | E06B 3/6715 52/786.13 |
| 4,799,745 A | 1/1989 | Meyer et al. | |
| 5,071,206 A | 12/1991 | Hood et al. | |
| 5,103,337 A | 4/1992 | Schrenk et al. | |
| 5,111,329 A | 5/1992 | Gajewski et al. | |
| 5,233,465 A | 8/1993 | Wheatley et al. | |
| 5,360,659 A | 11/1994 | Arends et al. | |
| 5,882,774 A | 3/1999 | Jonza et al. | |
| 5,971,754 A | 10/1999 | Sondhi et al. | |
| 6,049,419 A | 4/2000 | Wheatley et al. | |
| 6,498,683 B2 | 12/2002 | Condo et al. | |
| 6,744,561 B2 | 6/2004 | Condo et al. | |
| 6,830,791 B1 * | 12/2004 | Misonou | E06B 3/6612 52/204.593 |
| 6,927,900 B2 | 8/2005 | Liu et al. | |
| 7,019,905 B2 | 3/2006 | Weber | |
| 7,141,297 B2 | 11/2006 | Condo et al. | |
| 7,215,473 B2 | 5/2007 | Fleming | |
| 7,236,296 B2 | 6/2007 | Liu et al. | |
| 7,952,805 B2 | 5/2011 | Mcgurran et al. | |
| 8,932,701 B2 | 1/2015 | Kranz et al. | |
| 9,523,516 B2 | 12/2016 | Hebrink et al. | |
| 10,263,132 B2 | 4/2019 | Hebrink et al. | |
| 2006/0076008 A1 * | 4/2006 | Kerr | F24S 20/63 126/638 |
| 2006/0090834 A1 * | 5/2006 | Huang | B32B 27/36 156/107 |
| 2007/0281170 A1 * | 12/2007 | Seth | E06B 3/6715 428/432 |
| 2009/0068384 A1 * | 3/2009 | Seth | B32B 17/10055 428/34 |
| 2010/0294260 A1 * | 11/2010 | Chow | F24S 20/63 126/643 |
| 2012/0019906 A1 | 1/2012 | Van Nuffel et al. | |
| 2012/0092759 A1 * | 4/2012 | Suzuki | E06B 3/6715 359/359 |
| 2012/0234313 A1 * | 9/2012 | Rostami | F24S 10/755 126/674 |
| 2013/0061846 A1 * | 3/2013 | Colson | F24S 60/00 126/618 |
| 2013/0337200 A1 * | 12/2013 | Noethe | E06B 3/6715 428/34 |
| 2014/0300945 A1 * | 10/2014 | Parker | E06B 9/24 359/275 |
| 2015/0083195 A1 * | 3/2015 | Gilbert | F24S 10/40 126/650 |
| 2017/0067666 A1 * | 3/2017 | Levin | F24S 70/12 |
| 2017/0075049 A1 * | 3/2017 | Borrelli | E06B 9/24 |
| 2018/0148372 A1 * | 5/2018 | Bellman | C03C 17/3639 |
| 2019/0025481 A1 | 1/2019 | Du et al. | |
| 2019/0049152 A1 | 2/2019 | Otanicar et al. | |
| 2019/0131924 A1 * | 5/2019 | Lin | F24S 70/30 |
| 2019/0185423 A1 | 6/2019 | Hebrink et al. | |
| 2019/0369314 A1 * | 12/2019 | Hebrink | B32B 17/06 |
| 2020/0033028 A1 | 1/2020 | Nakamura | |
| 2020/0324245 A1 * | 10/2020 | Nakamura | E06B 7/12 |
| 2021/0280727 A1 * | 9/2021 | Jung | C09K 11/0883 |
| 2022/0026611 A1 * | 1/2022 | Wuillaume | E06B 3/6715 |
| 2022/0109394 A1 * | 4/2022 | Barr | E06B 9/24 |
| 2023/0160607 A1 * | 5/2023 | Miller | F24S 70/225 52/171.3 |
| 2023/0365460 A1 * | 11/2023 | Mahieu | C03C 17/3435 |

FOREIGN PATENT DOCUMENTS

| | | |
|---|---|---|
| JP | 2010144957 A | 7/2010 |
| KR | 20150004566 A | 1/2015 |
| WO | 2009120175 A1 | 10/2009 |
| WO | 2015002776 A1 | 1/2015 |
| WO | 2016103128 A1 | 6/2016 |
| WO | 2018063961 A1 | 4/2018 |
| WO | 2019116858 A1 | 6/2019 |

OTHER PUBLICATIONS

"SYLTHERM HF Heat Transfer Fluid", Product Technical Data, Dow Corning Corporation, Nov. 1997, 24 pages.
"SYLTHERM XLT Heat Transfer Fluid", Product Technical Data, Dow Corning Corporation, Feb. 1998, 27 pages.
Elsheikh, "Applications of Nanofluids in Solar Energy: A Review of Recent Advances", Renewable and Sustainable Energy Reviews, Feb. 2018, vol. 82, No. 3, pp. 3483-3502.
International Search Report for PCT Application No. PCT/IB2021/053841, mailed on Aug. 24, 2021, 6 pages.
Ulavi, "Analysis of a Hybrid Solar Window for Building Integration", Solar Energy, 2014, vol. 105, pp. 290-302.

* cited by examiner

HYBRID SOLAR WINDOW AND IR ABSORBING ASSEMBLIES

TECHNICAL FIELD

The present disclosure broadly relates to windows and solar energy.

BACKGROUND

Daylighting (i.e., bringing natural sunlight into interior architectural spaces) is a widely recognized approach towards an aesthetically pleasing indoor environment. Daylight provides visual comfort, and is considered to be a major cue to the human circadian rhythm. However, sunlight at non-visible wavelengths is not needed for daylighting.

Recently, Ulavi et al. in "Analysis of a hybrid solar window for building integration", *Solar Energy*, 105 (2015), 290-302, published a simulation of a hybrid solar window that allows some daylight to pass, but harnesses infrared radiation (hereinafter "IR") for solar thermal heating. In that simulation, a wavelength selective film is attached to a series of compound parabolic collectors (CPCs) made of transparent polymethyl methacrylate (PMMA) or polycarbonate, and integrated into a window on the interior side of a low-iron glazing. The wavelength selective film divides the incident solar spectrum into visible (transmitted) and near-infrared (reflected) bands. Spectrally selective CPCs are connected to tubular absorbers via end plates that can pivot about rubber bushings. A heat transfer fluid such as water or a water/antifreeze mixture is circulated through the absorber tubes. The window may be operated in two modes by adjusting the position of the CPCs. In the concentrating mode, the CPCs are closed. The CPC/selective film transmits the visible portion of the incident solar spectrum to the interior space for daylighting. The infrared portion of the spectrum is concentrated onto the absorber tubes to generate useful thermal energy. Blocking the infrared portion of the solar spectrum serves to passively cool the interior space. In an alternative non-concentrating mode, the collectors can be opened to allow the full solar spectrum to be transmitted into the interior space.

SUMMARY

Hybrid solar windows according to the present disclosure improve upon the concepts discussed above, by providing an improved infrared absorbing compound having an improved ratio of visible light transmission to infrared light absorption over selected wavelengths. This results in a relatively high ratio of visible light transmittance through the window relative to the IR absorbed by the solar collector, resulting in either increased daylighting at a comparable IR absorption level or increased IR absorption at a comparable daylighting level.

Accordingly, in one aspect, the present disclosure provides a hybrid solar window comprising:
  at least one glazing;
  a wavelength-selective solar mirror positioned to reflect IR toward an IR absorbing element comprising:
    a conduit having a respective fluid inlet and fluid outlet; and
    an IR absorbing element comprising an IR absorbing compound, wherein the IR absorbing element is in thermal communication with the conduit,
  wherein the wavelength-selective solar mirror has an average visible light transmittance of at least 50 percent and an average IR reflectance of at least 50 percent over the wavelength range of 850 to 1150 nanometers, inclusive, and
    wherein the IR absorbing element is configured to transfer thermal energy to a heat transfer fluid circulating through the conduit, wherein the IR absorbing element has an average visible light transmittance of at least 30 percent, and wherein each IR absorbing element has an average IR absorptance of at least 50 percent over the wavelength range 850 to 1150 nanometers, inclusive.

In another aspect, the present disclosure provides an infrared absorbing element comprising a conduit containing reduced tungsten oxide particles having an average tungsten oxidation state of less than 6 dispersed in a heat transfer fluid, wherein the heat transfer fluid contains a polymeric dispersant.

In yet another aspect, the present disclosure provides an infrared absorbing element comprising:
  a conduit containing a heat transfer fluid;
  a polymer film in thermal communication with the conduit, wherein the polymer film has a coating thereon comprising an IR absorbing compound retained in a binder.

As used herein:
  the term absorptance (as percent) is calculated as:

absorptance=100 percent−percent transmission−percent reflection the term "glazing" refers to transparent and/or translucent material (e.g., such as glass or polymethyl methacrylate) used for window(s), doors, roofs (e.g., a greenhouse roof), and skylights;
  the term "visible light" refers to electromagnetic radiation having a wavelength in the range of 400 to 700 nanometers, inclusive; and
  the term "transparent" refers to the transmission of electromagnetic radiation through a material that may result in specular and/or diffuse transmission of the electromagnetic radiation in an amount of at least 10%.

Features and advantages of the present disclosure will be further understood upon consideration of the detailed description as well as the appended claims.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Figure 1:
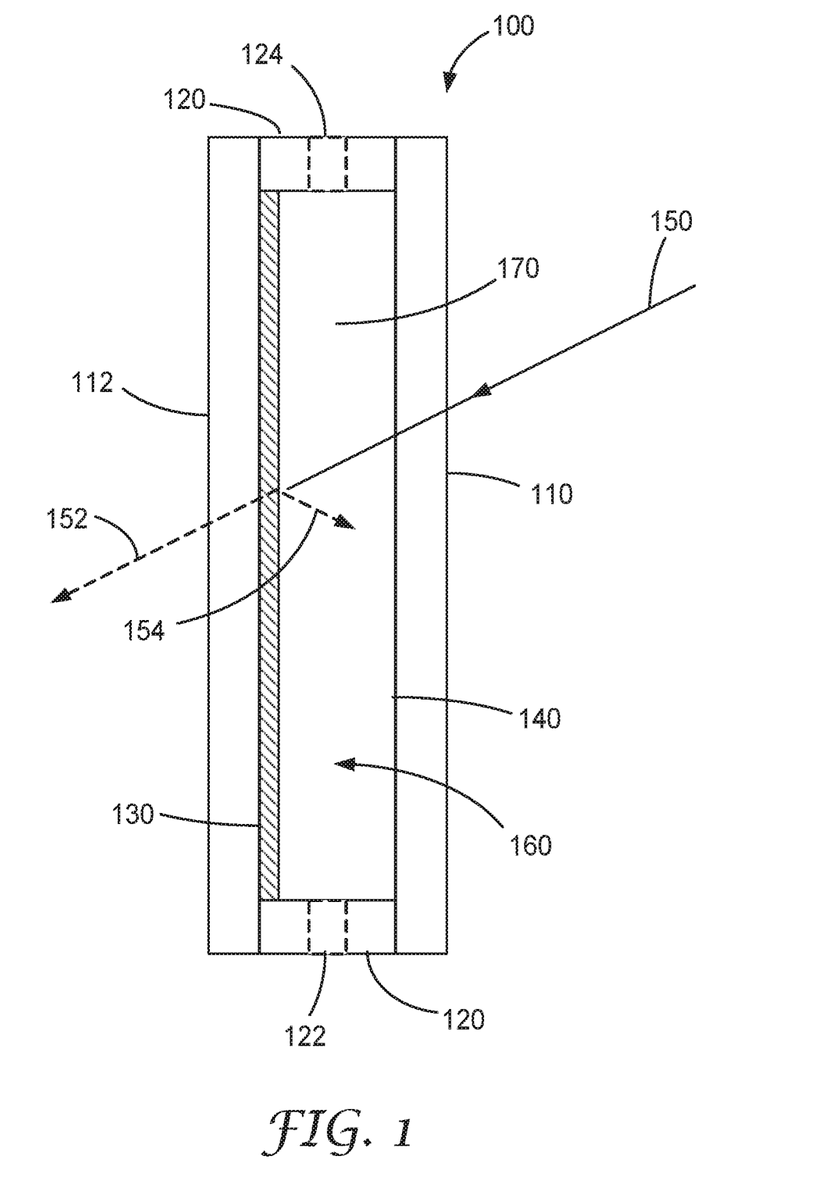
FIG. 1 is a schematic end view of an exemplary hybrid solar window 100 according to the present disclosure.

Referring now to FIG. 1, exemplary hybrid solar window 100 comprises first and second glazings 110, 112 separated by spacer seal 120. Inlet and outlet ports 122, 124 through the spacer seal defined conduit 140, which contains circulating heat transfer fluid 170 containing the IR absorbing compound (not shown). In typical use, wavelength-selective solar mirror 130, affixed to the second glazing 112 between the first and second glazings, receives solar radiation 150 and reflects infrared radiation 154 toward the IR absorbing compound while transmitting visible radiation 152 through the hybrid solar window. Note that in this exemplary embodiment, the IR absorbing element 160 comprises the conduit and the IR absorbing compound dissolved or dispersed in the circulating heat transfer fluid. The resulting heated heat transfer fluid is pumped from the window for use in heating elsewhere and refreshed by recycled heat transfer fluid.

Figure 1A:
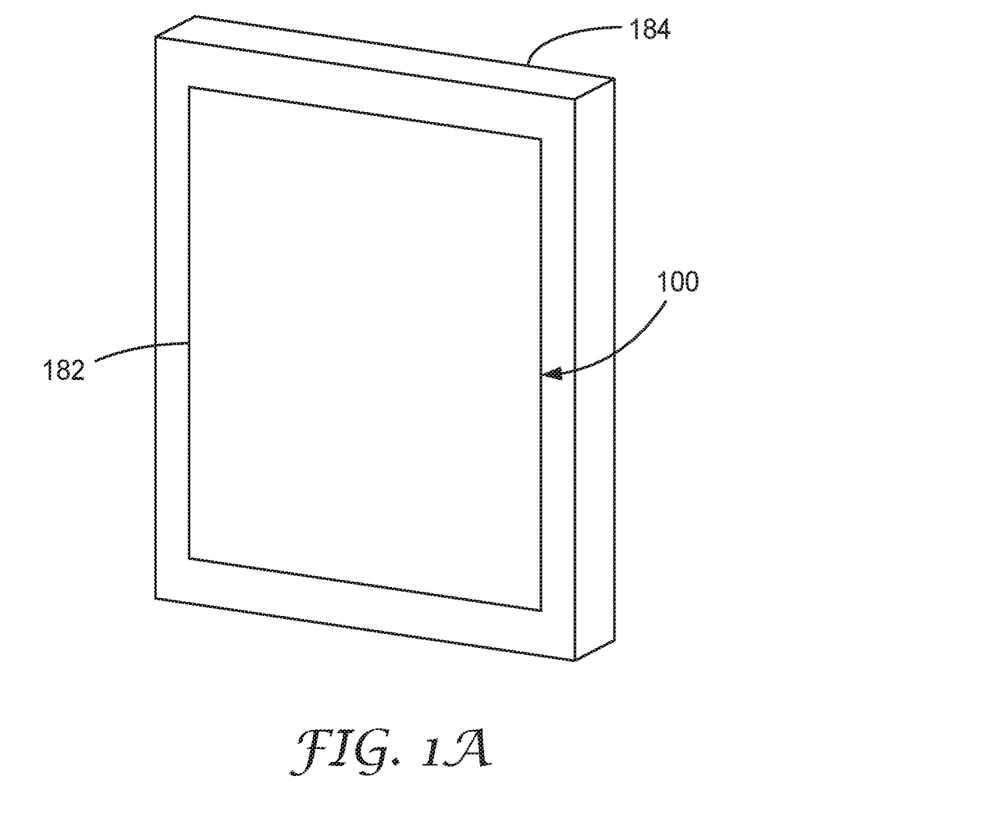
FIG. 1A is a schematic perspective view of exemplary hybrid solar window 100 mounted in a frame 184.

FIG. 1A shows hybrid solar window 100 mounted in the opening 182 of a frame 184.

Figure 2:
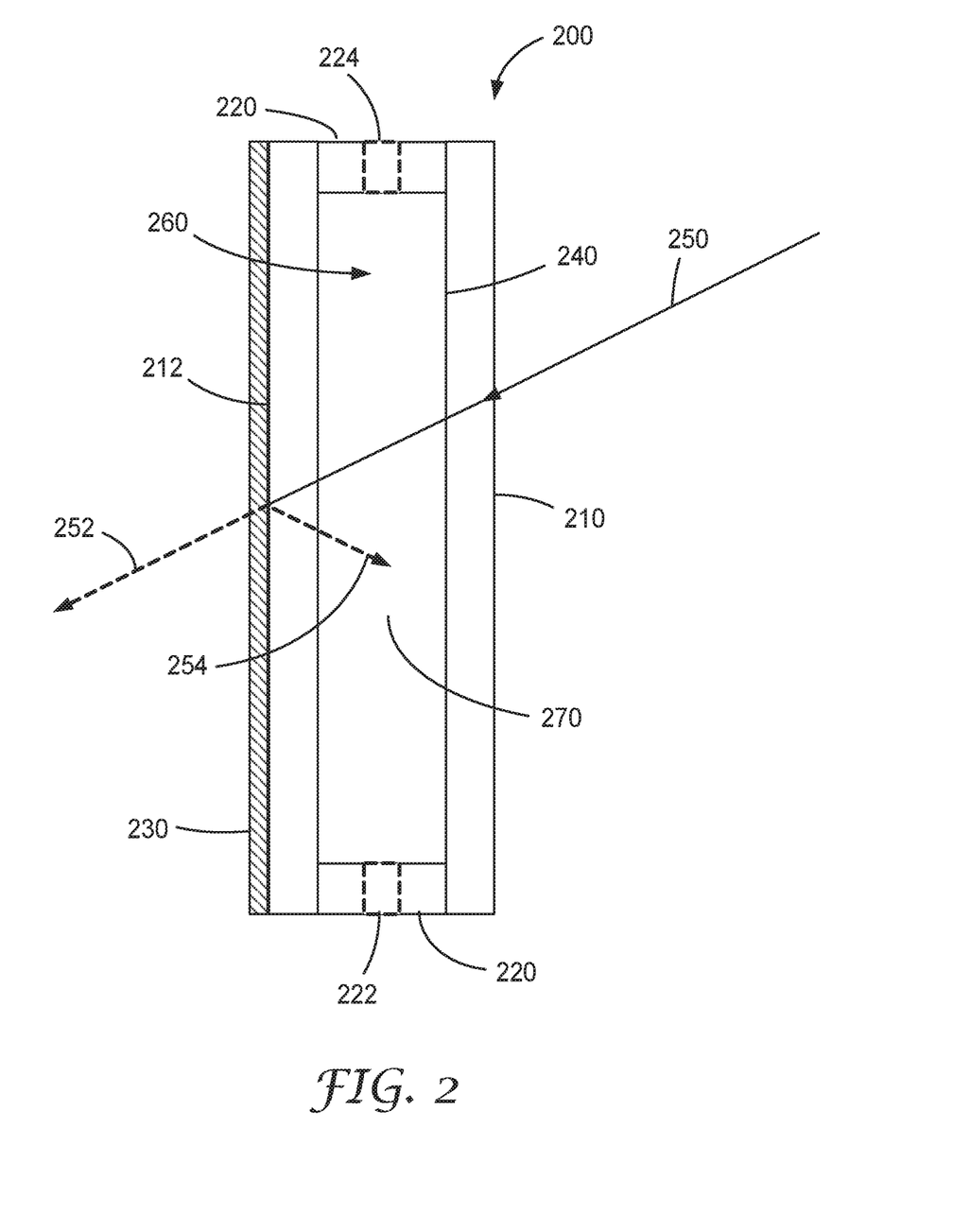
FIG. 2. is a schematic end view of an exemplary hybrid solar window 200 according to the present disclosure.

An alternate configuration is shown in FIG. 2. wherein exemplary hybrid solar window 200 comprises first and second glazings 210, 212 separated by spacer seal 220. Inlet and outlet ports 222, 224 through the spacer seal define conduit 240, which contains circulating heat transfer fluid 270 containing the IR absorbing compound (not shown). In typical use, wavelength-selective solar mirror 230, affixed to the second glazing 212 opposite the first glazing, receives solar radiation 250 and reflects infrared radiation 254 toward the IR absorbing element 260 while transmitting visible radiation 252 through the hybrid solar window. Note that in this exemplary embodiment, the IR absorbing element 260 comprises the conduit and the IR absorbing compound dissolved or dispersed in the circulating heat transfer fluid. The resulting heated heat transfer fluid is pumped from the window for use in heating elsewhere and refreshed by recycled heat transfer fluid.

Other configurations of hybrid solar windows according to the present disclosure are possible.

Figure 3:
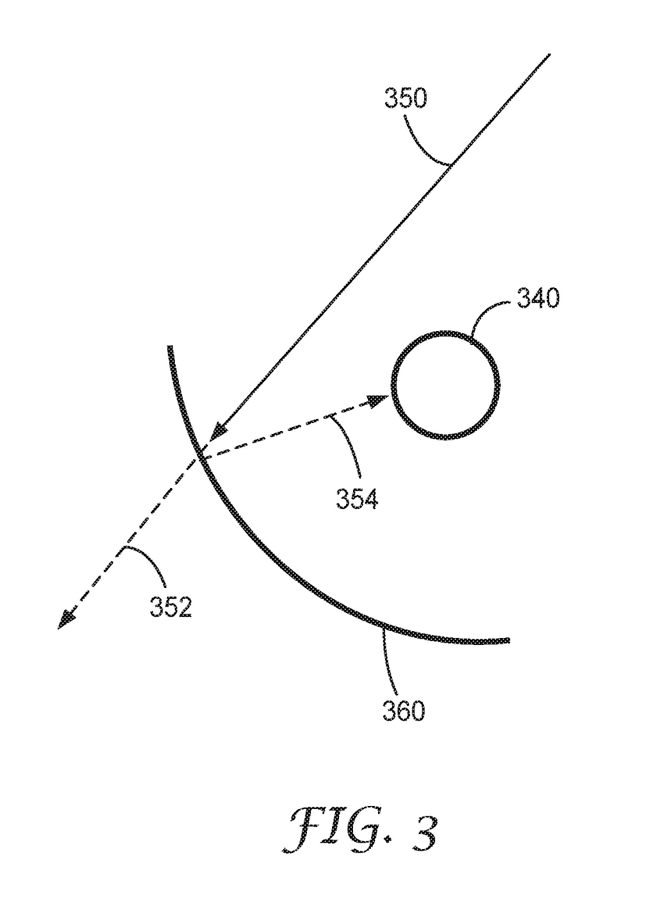
FIG. 3 is a schematic cross-sectional view showing a wavelength-selective solar mirror 360 having a parabolic cross-sectional surface profile.

For example, as shown in FIG. 3, the wavelength-selective solar mirror 360 may comprise a trough having a parabolic cross-sectional surface profile. Wavelength-selective solar mirror 360 receives solar radiation 350 and reflects infrared radiation 354 toward the IR absorbing element 340 while transmitting visible radiation 352 through the wavelength-selective solar mirror 360.

Figure 4:
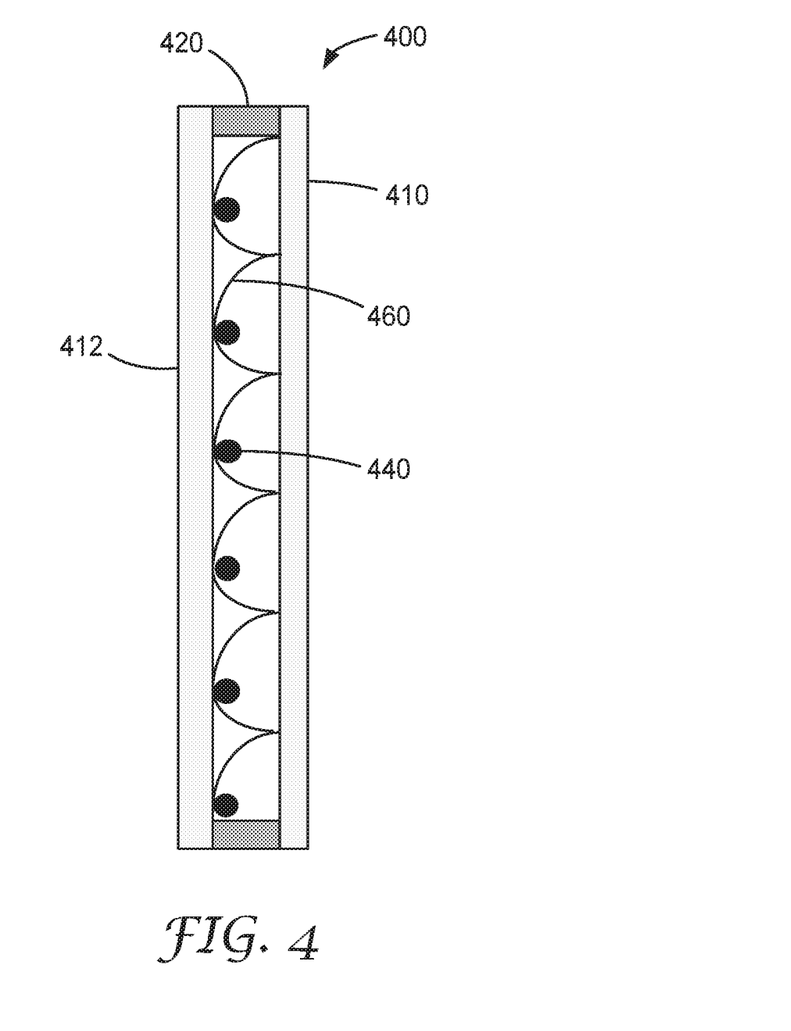
FIG. 4 is a schematic cross-sectional side view of hybrid solar window 400 according to the present disclosure having multiple wavelength-selective solar mirrors with a parabolic cross-section.

FIG. 4 shows a hybrid solar window 400 according to the present disclosure having multiple wavelength-selective solar mirrors 460 and IR absorbing elements 440 disposed between first and second panes 410, 412 are separated by spacer seal 420.

Figure 5:
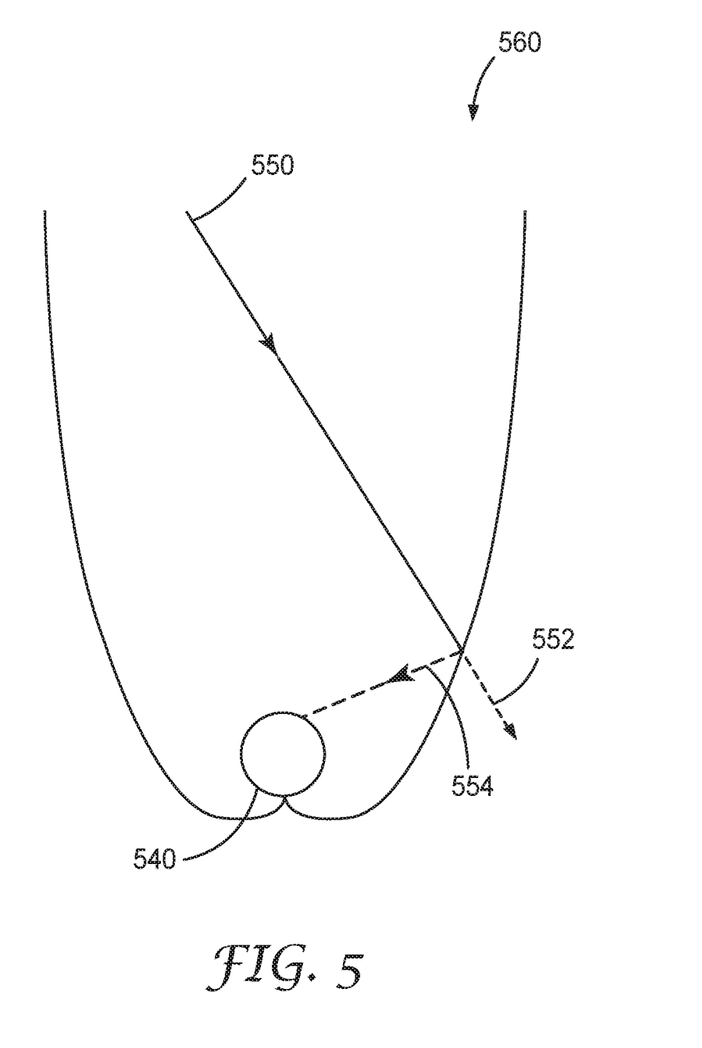
FIG. 5 is a schematic cross-sectional view showing a wavelength-selective solar mirror 560 having a compound parabolic cross-sectional surface profile.

Likewise, as shown in FIG. 5, the wavelength-selective solar mirror 560 may comprise a trough having a parabolic cross-sectional surface profile. Wavelength-selective solar mirror 560 receives solar radiation 550 and reflects infrared radiation 554 toward the IR absorbing element 540 while transmitting visible radiation 552 through the wavelength-selective solar mirror 560.

Figure 6:
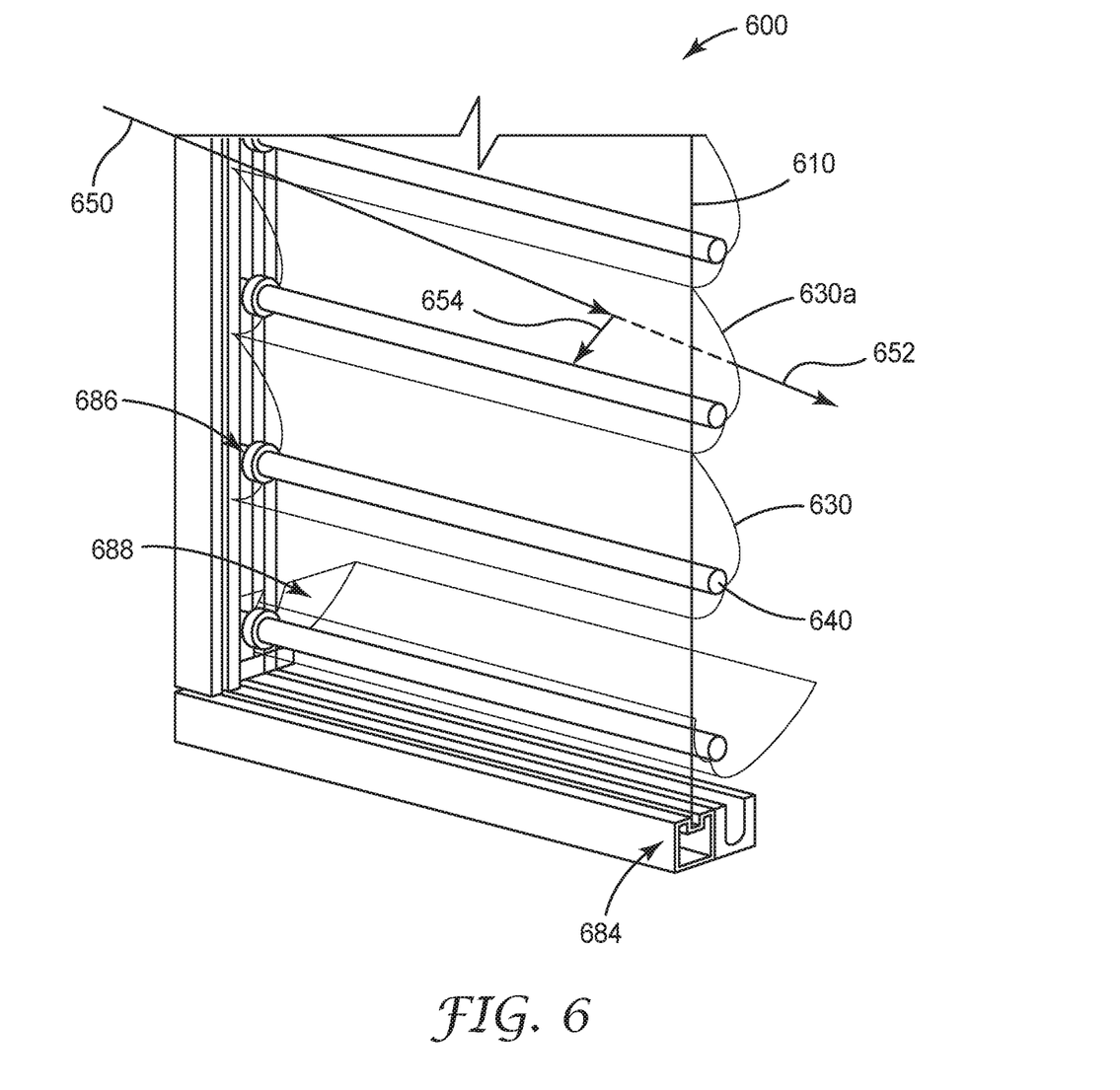
FIG. 6 schematic cross-sectional perspective view a hybrid solar window 600 according to the present disclosure having multiple wavelength-selective solar mirrors having such a design.

FIG. 6 shows a hybrid solar window 600 according to the present disclosure having multiple wavelength-selective solar mirrors 630 having such a design. As shown in FIG. 6, wavelength-selective solar mirrors 630 having truncated compound parabolic reflectors secured to IR absorbing elements 640 which is rotatable around its longitudinal axis. In some operating configurations of the hybrid solar window, the wavelength-selective solar mirrors are positioned to concentrate sunlight passing through glazing 610 mounted to frame 684 onto the absorber assemblies (i.e., a concentrating mode 686). Wavelength-selective solar mirror 630a receives solar radiation 650 and reflects infrared radiation 654 toward the IR absorbing element 640 while transmitting visible radiation 652 through the wavelength-selective solar mirror 630a. In another configuration, the wavelength-selective solar mirrors are positioned to not concentrate sunlight onto the absorber assemblies (i.e., a non-concentrating mode 688).

Other configurations of hybrid solar windows according to the present disclosure and not shown here are also permissible.

Various configurations of the IR absorbing element are possible.

Figure 7:
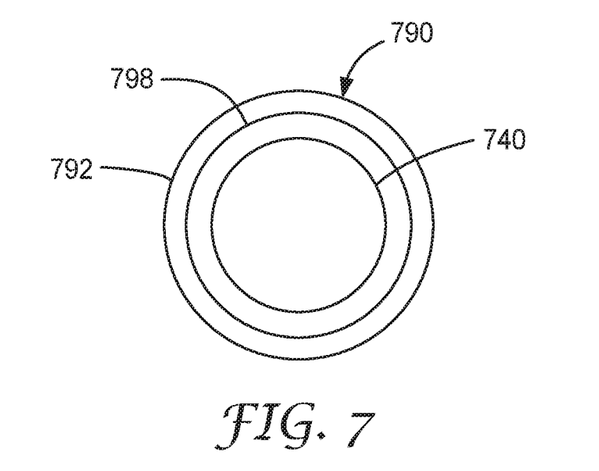
FIG. 7 is a schematic cross-sectional view showing an embodiment of a tubular IR absorbing element 790.

FIG. 7 shows an embodiment of a cylindrical conduit 740 surrounded by a tubular IR absorbing element 790 that comprises a polymeric tube 792 in thermal communication with transparent tube 798.

Figure 8:
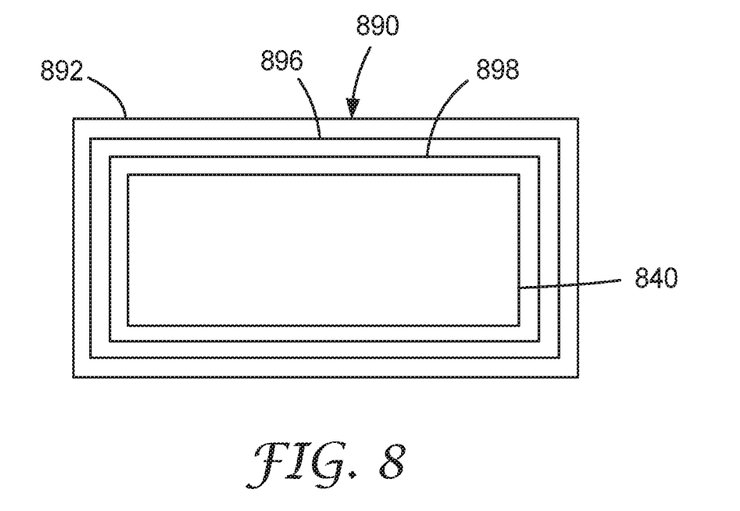
FIG. 8 is a schematic cross-sectional view showing another embodiment of a tubular IR absorbing element 890.

FIG. 8 shows an embodiment of an IR absorbing element 890 having a conduit 840 with a rectangular cross-section. IR absorbing element 890 comprises an adhesive layer 896 containing the IR absorbing compound (not shown) disposed between a protective polymer film 892 and a transparent rectangular tube 898.

In typical use, the hybrid solar window is positioned in a wall or ceiling of a building such that the glazing and wavelength-selective solar mirrors receive solar radiation and transmits at least a portion of the visible light contained in the solar radiation through the hybrid solar window. Wavelength-selective solar mirrors reflect infrared radiation toward IR absorbing elements where the IR is absorbed and converted to heat, most or all of which is imparted to the heat transfer fluid circulating through the conduit.

Useful glazing may comprise any transparent and/or translucent material in sheet form (e.g., a pane). Examples of suitable materials include: colorless and/or colored glasses such as, for example, float glass, safety laminated glass, obscured glass, annealed glass, tinted glass, tempered glass, quartz glass; colorless and/or colored plastic sheets such as, for example, polyethylene, polypropylene, polymethyl methacrylate, polycarbonate, or polyester sheets; and sapphire. The glazing may comprise a single pane or multiple panes (e.g., insulated glass). The glazing is mounted in an opening of a frame made, for example, from wood, metal, plastic (including vinyl), stone, ceramic, or a combination thereof.

The wavelength-selective solar mirrors and/or the absorber assemblies may be between panes of the glazing or disposed outside of them. The wavelength-selective solar mirrors and/or the absorber assemblies may be positioned inside or outside of a building, typically inside or between panes of the glazing.

The wavelength-selective solar mirror(s) is/are reflectors of certain infrared wavelengths while transmitting at least some incident visible light. The wavelength-selective solar mirror(s) may have a visible light (i.e., 400-700 nm, inclusive) average transmittance of at least 30, 40, 50, 60, 70, 80, 90, or even at least 95 percent. They are preferably shaped as a linear trough having a parabolic or compound parabolic cross-section, although other shapes are permissible.

Likewise, the wavelength-selective solar mirror(s) may have an average IR reflectance of at least 50, 55, 60, 65, 70, 76, 80, 75, 80, 85, or even 90 percent over the wavelength range of 850 to 1150 nanometers, inclusive. In some preferred embodiments, the wavelength-selective solar mirror(s) have an average IR reflectance of at least 50, 55, 60, 65, 70, 75, 80, 85, or even at least 90 percent over the wavelength range of 850 to 1850 nanometers, inclusive. In some preferred embodiments, the wavelength-selective solar mirror(s) may have an average IR reflectance of at least 50, 55, 60, 65, 70, 75, 80, 85, or even at least 90 percent over the wavelength range of 850 to 2500 nanometers, inclusive.

In some embodiments, the wavelength-selective solar mirror(s) are secured to the frame, preferably repositionably (e.g., tiltably) so it/they can track the sun (e.g., by a motor driven mechanism); however, they may have a fixed position if desired. In some embodiments, the wavelength-selective solar mirror(s) are secured to the IR absorbing element, preferably repositionably (e.g., tiltably) so it/they can track the sun (e.g., using a motor driven mechanism); however, they may have a fixed position if desired.

The wavelength-selective solar mirrors may comprise any visible light-transmissive and IR-reflective material. For example, wavelength-selective solar mirrors can be made using multilayer optical films.

These films may comprise many alternating layers of polymer films (e.g., selected from aromatic polyesters, aromatic polycarbonates, polystyrenes, polyethylene 2,6 naphthalate, and certain polyimides) having different refractive indexes and layer thicknesses that can preferentially reflect electromagnetic radiation at some or all infrared wavelengths within the range of 1250 to 2500 nanometers while transmitting visible light. Such multilayer optical films are described in, for example, U.S. Pat. No. 8,932,701 (Kranz et al.); U.S. Pat. No. 7,952,805 (McGurran et al.); U.S. Pat. No. 7,236,296 (Liu et al.); U.S. Pat. No. 6,049,419 (Wheatley et al.); U.S. Pat. No. 5,882,774 (Jonza et al.); U.S. Pat. No. 5,360,659 (Arends et al.); U.S. Pat. No. 5,103,337 (Schrenk et al.); and U.S. Pat. No. 4,799,745 (Meyer); and in PCT Publ. Nos. WO 2018/063961 (Hebrink et al.) and WO 2016/103128 (Stalder et al.).

Fabry-Perot filters containing one or more metallic layers between dielectric layers comprising metal oxides may also be used as described, for example, in U.S. Pat. No. 5,111,329 (Gajewski et al.) and U.S. Pat. No. 5,071,206 (Hood et al.), and in PCT Publ. No. WO 09/120175 (Stossel et al.).

Useful heat transfer fluids are preferably relatively high boiling and thermally stable, although this is not a requirement. Many are known in the art including, for example, water, glycol-based fluids, silicones, polydimethylsiloxane, hydrocarbons, linseed oil, canola oil, alkylated aromatic hydrocarbon fluids, and combinations thereof. Useful heat transfer fluids may be sold under the trade designations DOWTHERM, SYLTHERM, DOWFROST, and DOWCAL by Dow Chemical, Midland, Mich. Additional components of the heat transfer fluid may include anti-corrosion additives, anti-fouling additives, and/or buffers, for example.

Useful infrared absorbing compounds preferably have a relatively lower average molar absorptivity throughout many or all the visible wavelengths and a relatively higher average molar absorptivity in the infrared wavelength range of 850 to 1150 nanometers, preferably 850 to 1850 nanometers, and more preferably 850 to 2500 nanometers, although this is not a requirement.

Suitable IR absorbing compounds may include, for example: transparent conducting oxides such as indium tin oxide (ITO), antimony tin oxide (ATO), gallium tin oxide (GTO), antimony zinc oxide (AZO), aluminum/indium doped zinc oxide, doped tungsten oxides like cesium tungsten oxides, tungsten blue oxides; metal oxide pigments such as metal chromates, molybdates, titanates, tungstates, aluminates, and ferrites, and which may contain metals such as iron, manganese, nickel, titanium, vanadium, antimony, cobalt, lead, cadmium, chromium, or bismuth; IR absorbing compounds with some visible colors and transmission such as cobalt aluminate spinels, cobalt chromite spinels, cobalt phosphates, other transition metal spinel oxides, copper oxides, copper phosphates, $LiFePO_4$ and other iron phosphates and iron oxides, yttrium indium manganese oxides, YInMn blue, lanthanide glasses, lanthanide oxides, lanthanide phosphates, where the lanthanide ion is selected from the f-block elements in the periodic table of atomic number 57 through 71; metal borides such as lanthanum hexaboride; metal nitrides and metal oxynitrides; conducting polymer nanoparticles such as PEDOT-PSS nanoparticles; metal chalcogenides such as metal sulfides and selenides such as copper sulfide and copper selenide nanoparticles, tungsten disulfides and molybdenum disulfides; plasmonic metal nanoparticles such as gold nanoparticles, silver nanoparticles, and copper nanoparticles; near-infrared absorbing dyes/pigments such as phthalocyanines, cyanines, transitional metal dithiolines, squaryliums, croconiums, quinones, anthraquinones, iminiums, pyryliums, thiapyryliums, azuleniums, azos, peiylenes, quatenylenes, indoanilines, and combinations thereof. Commercially available suitable IR absorbing compounds are available as Lumogen IR 765 and Lumogen IR 788 by BASF (Ludwigshafen, Germany). In some preferred embodiments, the IR absorbing compound comprises reduced tungsten oxide nanoparticles having an average tungsten oxidation state of less than 6.

In some embodiments, the IR absorbing compound is dispersed or dissolved in the heat transfer fluid. Selection of the appropriate concentration will depend on design of the hybrid solar window, and is within the capability of those of ordinary skill in the art.

Generally speaking, it is desirable that the IR absorbing element to have a high absorptance of reflected infrared radiation. Accordingly, its average absorptance over the wavelength range 850 to 1150 nm, 850 to 1650 nm, and/or 850 to 2500 nm may be at least 50 percent, at least 60 percent, at least 70 percent, at least 80 percent, or even at least 90 percent, for example.

In some embodiments, the IR absorbing element comprises a thermoplastic polymer film (e.g., wound one or more times to form a sleeve). The thermoplastic polymer film may contain the IR absorbing compound and/or the IR absorbing compound may be present in a coating on a surface of the film. The IR absorbing element comprising the IR absorbing compound (not shown) in thermal communication with the conduit. The IR absorbing element may be a coating, a thermoplastic polymer film, or an adhesive layer (e.g., a hotmelt and/or pressure-sensitive adhesive layer), for example. In some embodiments, light scattering particles (e.g., inorganic oxide particles), high emissivity particles, or thermally conductive particles can be incorporated in the IR absorbing element to increase IR absorption.

The conduit may have any shape as long as the heat transfer fluid may circulate through it. In some preferred embodiments, it is tubular. In other preferred embodiments, it has a flat parallel plate configuration.

In some embodiments, the IR absorbing element comprises an optical camouflage element as described in U.S. Pat. Appl. Publ. No. 2019/0025481 (Wheatley et al.). The optical camouflage element reduces the aesthetic visual impact of the IR absorbing element. In these embodiments, the optical camouflage element comprises an optical filter comprising a wavelength selective scattering layer, wherein the wavelength selective scattering layer has a near-infrared scattering ratio of less than about 0.9, the near infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight (wt.).

The following examples show the effect of tungsten blue oxide ($WO_{2.81}$) and cesium tungsten oxide (CWO) as an infrared absorbing compound for use in an IR absorbing element according to the present disclosure.

Preparative Example 1 (Pe-1)

Tungsten blue oxide ($WO_{2.81}$) powder (302 grams (g)) was combined with PVP 10 (60 g) and dissolved in water (450 g) in a Dispermat CN-10 laboratory high-shear disperser (BYK-Gardner USA, Columbia, Md.). The mixed dispersion was milled in a LabStar laboratory media mill (Netzsch, Exton Pa.) with 0.2 mm Toraycerum Yttria stabilized zirconia milling media. Aliquots were taken out periodically to monitor the milling progress. The dispersion samples were further diluted by water and the particle sizes were measured by Partica LA-950 Laser Diffraction Particle Size Distribution Analyzer (Horiba, Irvine, Calif.). The solid content measured by drying the dispersion in nitrogen purged oven at 65° C. was 32 wt. % of the dispersion. Transmittance of the dispersion at 0.01 wt. % and 0.005 wt. % concentration in a 1 centimeter pathlength PMMA cuvette were measured with a fiber optic UV-vis spectrometer ("JAZ" model) using a halogen bulb light source (HL-2000-FHSA) all from Ocean Optics Inc., Dunedin, Fla.

Preparative Example 2 (Pe-2)

An acrylate-based coating resin was prepared as follows: the resin is a 50:50 wt.:wt. blend of 1,6-hexanediol diacrylate (HDDA) and pentaerythritol triacrylate. The acrylate blend was diluted with methyl ethyl ketone (MEK) to make a 36 wt. % solution. Diphenyl(2,4,6-trimethylbenzoyl)phosphine oxide (Aldrich, Milwaukee, Wis.) was added to the acrylate hardcoat blend to make a 2 wt. % photoinitiator solution.

Cesium tungsten oxide (CWO) nanoparticle dispersion, YMF-02A commercially available from Sumitomo Metal and Mining Japan (4.8 g), was combined with the acrylate resin mix (10 g) to prepare a coating solution. The coating solution was coated with a Meyer rod #8 on a clear polyethylene terephthalate film. The coated film was dried in a 110° C. oven for about 2 minutes, then UV-cured under nitrogen with an H-type bulb at 300 watts/inch, full power setting (Fusion UV Systems Inc., Gaithersburg, Md.) at 20 feet/minute (6.1 m/min).

Example 1 (Ex-1)

Fluid filled glass tubes were exposed to solar radiation outdoors. The ambient conditions were as follows: temperature—72° F., wind—15 mph (south), relative humidity—20%, skies—overcast. The glass cylinders (50" H×3" D) were filled with either distilled water or a 0.005 wt. % tungsten blue oxide dispersion. Each cylinder was attached to a ring stand and brought outside. They were each equipped with a temperature probe. At 10-minute time intervals, over the course of 40 minutes, the temperature of each liquid in the cylinder was recorded.

Figure 9:
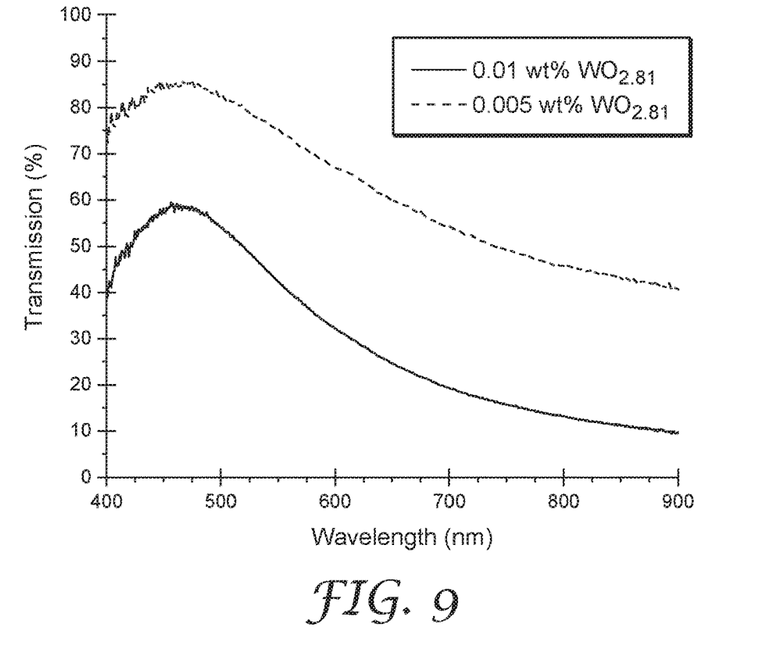
FIG. 9 is a transmission spectrum.

FIG. 9 shows the transmission spectrum in the visible and near-IR wavelengths for the tungsten blue oxide nanoparticle in water at two different concentrations and path length of 1 cm.

Table 1 (below) reports time and temperatures of the fluids in each cylinder during exposed to solar radiation.

TABLE 1

| Time (min) | Fluid | Temperature, ° C. |
|---|---|---|
| 0 | water | 19.5 |
| 0 | 0.005 wt. % $WO_{2.81}$ in water | 20 |
| 10 | water | 19.4 |
| 10 | 0.005 wt. % $WO_{2.81}$ in water | 20.4 |
| 20 | water | 18.7 |
| 20 | 0.005 wt. % $WO_{2.81}$ in water | 20.4 |
| 30 | water | 18.8 |
| 30 | 0.005 wt. % $WO_{2.81}$ in water | 20.9 |
| 40 | water | 19.6 |
| 40 | 0.005 wt. % $WO_{2.81}$ in water | 22.1 |

Example 2 (Ex-2)

The fluid filled tubes were exposed to solar radiation outdoors. The ambient conditions were as follows: temperature—79° F., wind—12 mph (southwest), relative humidity—20%, skies—sunny. Glass cylinders (50" H×3" D) were either left unwrapped or wrapped with a polyester film (Clear YS) coated with a cesium tungsten oxide nanoparticle dispersion from Sumitomo Metal and Mining in an acrylate hardcoat (1.5 mil PET film with 3 micron coating). The cylinder was wrapped such that four layers of film overlapped over the length of the cylinder. Each cylinder was attached to a ring stand and brought outside. They were each equipped with a temperature probe. At intervals over the course of 60 minutes the temperature of each liquid in the cylinder was record.

Figure 10:
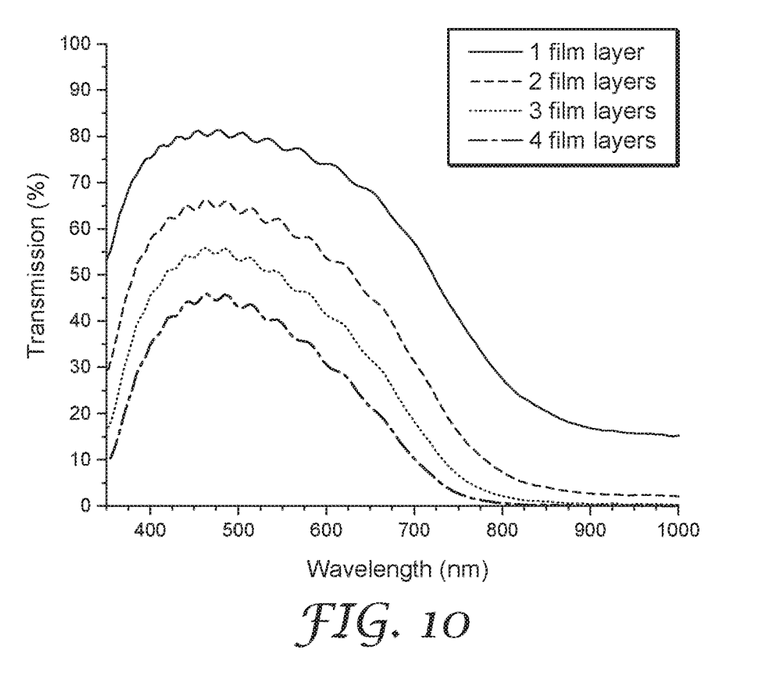
FIG. 10 is a transmission spectrum.

FIG. 10 shows the transmission spectrum in the visible and near-IR wavelengths for the film coated with cesium tungsten oxide nanoparticles in acrylate hardcoat at four different layer thicknesses.

Table 2 (below) reports time and temperatures of the fluids in each cylinder during solar exposure.

TABLE 2

| TIME, minutes | WRAPPING AROUND CYLINDER | TEMPERATURE, ° C. |
|---|---|---|
| 0 | none | 19 |
| 0 | PE-2 | 20 |
| 10 | none | 19.1 |
| 10 | PE-2 | 20.7 |
| 45 | none | 19.9 |
| 45 | PE-2 | 23 |
| 60 | none | 21.2 |
| 60 | PE-2 | 24.5 |

Any cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A hybrid solar window comprising:
   at least one glazing;
   a wavelength-selective solar mirror positioned to reflect infrared (IR) toward an IR absorbing element comprising:
   a conduit having a respective fluid inlet and fluid outlet; and
   an IR absorbing compound, wherein the IR absorbing compound is in thermal communication with the conduit,
   wherein the wavelength-selective solar mirror has an average visible light transmittance of at least 50 percent and an average IR reflectance of at least 50 percent over a wavelength range of 850 to 1150 nanometers, inclusive, and
   wherein the IR absorbing element is configured to transfer thermal energy to a heat transfer fluid circulating through the conduit, wherein the IR absorbing element has an average visible light transmittance of at least 30 percent, and wherein each IR absorbing element has an average IR absorptance of at least 50 percent over a wavelength range 850 to 1150 nanometers, inclusive; and
   wherein the hybrid solar window further comprises an optical camouflage element at least partially surrounding the IR absorbing element, wherein the optical camouflage element comprises an optical filter comprising a wavelength selective scattering layer, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

2. The hybrid solar window of claim 1, wherein the wavelength-selective solar mirror has an average IR reflectance of at least 50 percent over a wavelength range of 850-1850 nm.

3. The hybrid solar window of claim 1, wherein the wavelength-selective solar mirror has an average IR reflectance of at least 50 percent over a wavelength range of 850-2500 nm.

4. The hybrid solar window of claim 1, further comprising a frame having an opening, wherein the at least one glazing is mounted to the frame within the opening.

5. The hybrid solar window of claim 1, wherein the IR absorbing compound is dispersed or dissolved in the heat transfer fluid.

6. The hybrid solar window of claim 1, wherein the IR absorbing element comprises the IR absorbing compound retained in a polymer matrix.

7. The hybrid solar window of claim 6, wherein the IR absorbing element comprises a thermoplastic polymer film and the IR absorbing compound.

8. The hybrid solar window of claim 6, wherein the IR absorbing element comprises at least one of a hot melt or a pressure-sensitive adhesive.

9. The hybrid solar window of claim 1, wherein the IR absorbing compound comprises reduced tungsten oxide nanoparticles having an average tungsten oxidation state of less than 6.

10. The hybrid solar window of claim 1, wherein the wavelength-selective solar mirror has a parabolic or compound parabolic cross-sectional surface profile.

11. The hybrid solar window of any of claim 1, wherein the wavelength-selective solar mirror comprises a multilayer optical film.

* * * * *